United States Patent
Liebman et al.

[11] Patent Number: 5,860,583
[45] Date of Patent: Jan. 19, 1999

[54] EVAPORATIVE COOLING VESSEL FOR CONTROLLING THE TEMPERATURE OF A PORTION OF AN ELECTRONIC PART DURING SOLDER REFLOW

[75] Inventors: Henry F. Liebman, Tamarac; Anthony J. Suppelsa, Coral Springs; Hal R. Canter, Fort Lauderdale, all of Fla.

[73] Assignee: Motorola, Inc., Schaumburg, Ill.

[21] Appl. No.: 675,313

[22] Filed: Jul. 1, 1996

[51] Int. Cl.$^6$ ........................................... B23K 3/08
[52] U.S. Cl. ............................................... 228/46
[58] Field of Search ........................... 228/222, 46

[56] References Cited

U.S. PATENT DOCUMENTS

| 3,430,686 | 3/1969 | Parkinson et al. | 165/1 |
| 3,616,533 | 11/1971 | Heap et al. | 29/626 |
| 5,230,462 | 7/1993 | Vascak et al. | 228/222 |

FOREIGN PATENT DOCUMENTS

| 137 201 | 8/1979 | Germany | 228/222 |
| 7022-945 | 6/1977 | Japan | 228/222 |

OTHER PUBLICATIONS

Electronic Design, "Wet Felt Sinks Heat," p. 103, Apr. 1, 1959.

*Primary Examiner*—Kenneth J. Ramsey
*Attorney, Agent, or Firm*—Frank M. Scutch, III

[57] ABSTRACT

An evaporative cooling vessel (100) for controlling the temperature of a predetermined portion of an electronic part during the solder reflow process. The evaporative cooling vessel (100) includes a cavity (105) for holding a fugitive material (107) at the housing (111) of an electronic part to maintain the housing at or below a specified temperature. As heat is applied during solder reflow, the electronic part is subjected to a high temperature capable of allowing solder to melt. Thus, the part housing (111) of the electronic part can be controlled at a substantially lower temperature than the reflow temperature. This allows the evaporative cooling vessel (110) to use the evaporative cooling properties of the fugitive material to prevent damage to the electronic part.

8 Claims, 2 Drawing Sheets

EVAPORATIVE COOLING VESSEL FOR CONTROLLING THE TEMPERATURE OF A PORTION OF AN ELECTRONIC PART DURING SOLDER REFLOW

TECHNICAL FIELD

This invention relates in general to soldering electronic parts and more particularly to reflow soldering.

BACKGROUND

Many techniques have been developed in order to produce a high volume of electronic circuits at a rapid pace. One of these processes is generally referred to as solder reflow and involves heating a printed circuit board as a unitary structure to melt or reflow solder onto a number of electronic parts at one time.

More specifically, during the reflow soldering process a solder paste is applied at predetermined positions about a printed circuit board. These positions are determined by the placement of electronic parts on the board in relation to the metal runners or traces which have been printed on the board substrate. The solder paste is applied in a thin layer and is comprised of a mixture of solder material and a flux. Most often in soldering electronic parts the flux is a rosin-like material which acts to clean any oxides from the metal traces before the solder, allowing the solder to adhere to the metal trace.

After application of the solder paste, the electronic parts are surface mounted or inserted into fabricated holes in the circuit board. The printed circuit board is then passed through a soldering oven, commonly referred to as a reflow oven, where the printed circuit board and electronic parts are subjected to a temperature profile peaking at approximately 210 degrees Celsius. The peak oven temperature is dependent on the type of alloy being reflowed. Here, each position where the solder paste has been applied is melted allowing it to bond the electronic part to the metal trace of the printed circuit board.

A problem arises during the reflow process when specific portions of the electronic device which contain heat sensitive materials are subjected to such high temperatures. Often this in itself can cause a failure either to a semiconductor device or other parts such as connectors or the like. These parts include materials which were never intended to be subjected to such high temperature but are being used in this manner to facilitate a rapid production rate using the solder reflow process.

Thus, the need exists to provide an apparatus for controlling temperature of the electronic part during the solder reflow process to prevent damage and/or failure to electronic parts or devices, yet allow solder reflow temperatures to exist at solder joint areas.

DETAILED DESCRIPTION OF THE PREFERRED EMBODIMENT

Figure 1:
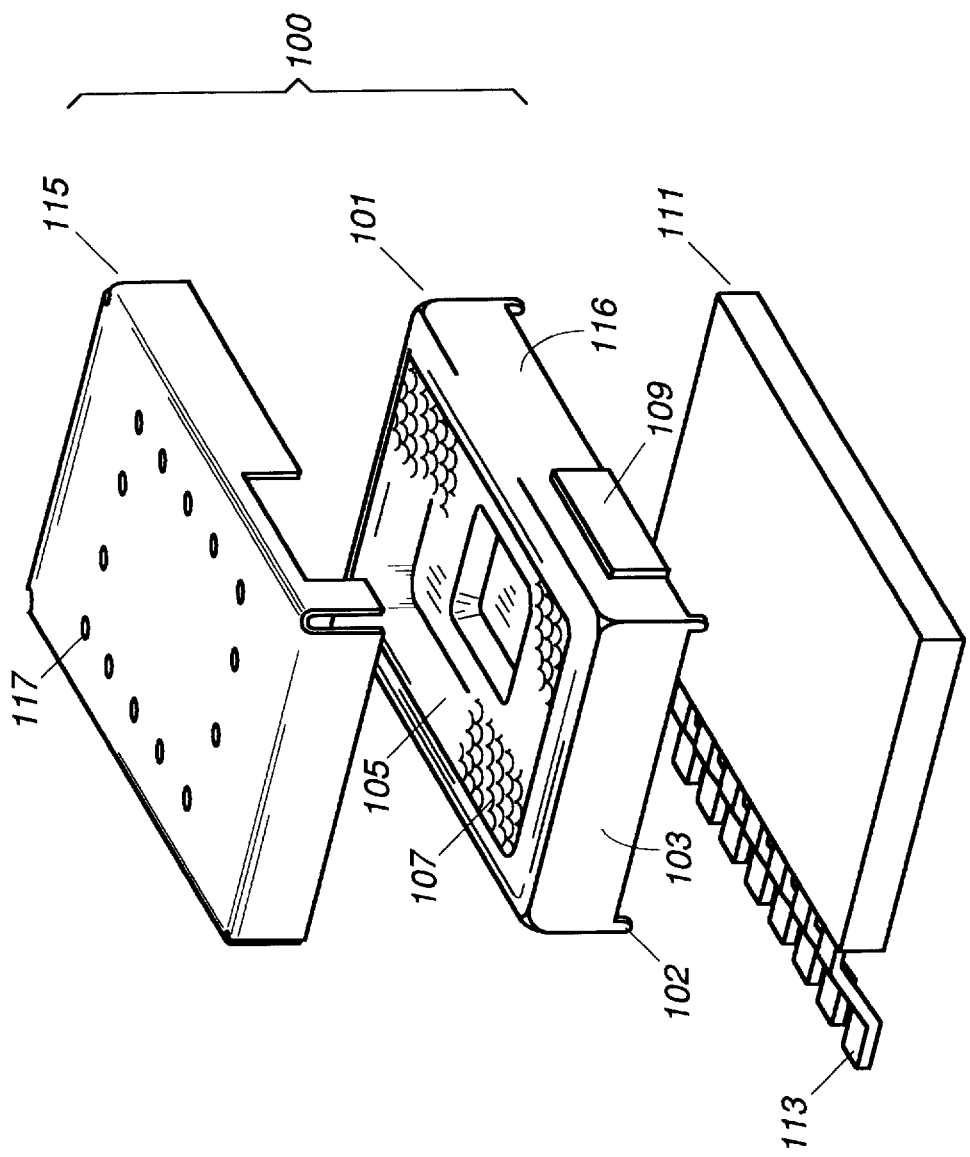
FIG. 1 is an isometric view of the evaporative cooling vessel used during solder reflow in accordance with the preferred embodiment of the invention.
Figure 2:
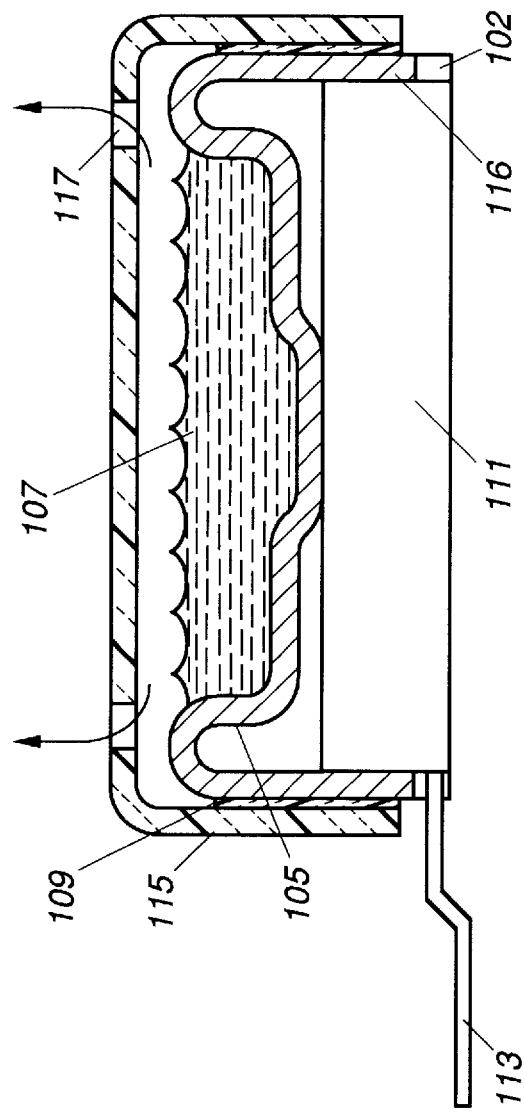
FIG. 2 is a cross-sectional view of the evaporative cooling vessel shown in FIG. 1.

Referring now to FIG. 1, an isometric view of the evaporative cooling vessel 100 includes a housing such as the main body 101. The main body 101 is preferably made of a rigid material having a high thermal conductivity such as copper, aluminum or the like. The main body 101 includes one or more substantially thick side walls 103 for providing a heat sinking capability and one of more feet 102 the protrude from a lower portion of the main body 101 for locating the main body 101 on a substantially flat surface. A cavity 105 is channeled or formed into the main body 101 in order to hold or contain a fugitive material 107, such as water, in liquid form within a specific location. Although the cavity 105 is shown as square, it will be evident to those skilled in the art the cavity 105 may be any shape and preferably is a substantially deep cavity that holds a predetermined amount of the fugitive material 107.

In operation, a part housing 111 of an electronic part is placed in contact to the lower section of the main body 101. When attached to the evaporative cooling vessel 100, the part housing 111 of the electronic part remains cool while the solder leads 113 remain free and unencumbered. This allows the solder leads to be reflow soldered in a solder reflow oven while preventing the part housing 111 from reaching a specified unacceptably high temperature. The part housing 111 of the electronic part remains securely in contact to the main body 101 to provide maximum heat transfer.

In order to minimize the escape of the fugitive material 107 from the cavity 105, a lid such as cover 115 is provided. The cover 115 is generally made of heat rejecting materials such as RYTON™ high temperature plastic. The cover 115 works to frictionally engage with one or more sides 116 of the main body 101 to cover and prevent the rapid escape of volatile fugitive material 107 when heated to reflow temperatures. When at reflow temperatures the fugitive material 107 will slowly change to a vapor or gaseous form over a period of time. The cover 115 may include one or more sections of insulative sections 109. It will also be evident to those skilled in the art that the insulating materials 109 may be directly attached to exposed areas of the housing 101 to prevent heat absorption during reflow. The insulative sections 109 are manufactured of insulative material whose insulative properties act to prevent the rapid escape of fugitive material from the sides of the cover 115. A plurality of vents 117 are also provided in the cover 115 to prevent excess pressure, building up under the cover lo, from moving the cover 115 from it's fixed position.

Thus in order to control the temperature of an electronic part during the solder reflow process, the evaporative cooling vessel 100 allows the fugitive material 107 to be used to cool selective portions of an electronic part(s) that may be heat sensitive. Heat sensitive can be defined as those areas of the electronic part which may be damaged by overheating from high exposure temperatures generated within a reflow oven used in the solder reflow process. Fugitive materials include those liquids with evaporative properties such as water or glycol that evaporate either totally or partially when subjected to a high temperature condition. It will be recognized by those skilled in the art that fugitive materials are highly effective for cooling purposes since they will not exceed a specified temperature. The fugitive material will remain at the specified temperature and evaporate into a gaseous state.

After the fugitive material is indirectly in contact with the heat sensitive portions of the electronic device, the evaporative cooling vessel 100 is inserted into a solder reflow oven where it is subjected to substantially high temperatures that generally exceed 190 degrees Celsius (C.) or higher. Here, a solder paste is melted which acts to connect the solder leads 113 of the electronic component to areas of a printed circuit board. In the areas where the fugitive material is in indirect contact with the part housing 111 of the electronic part, the part housing 111 of the electronic device is maintained at a lower temperature through use of the evaporative cooling properties and characteristics of the fugitive material.

For example, if water is used as the fugitive material and is placed in the cavity 105, the part housing 111 of the electronic component will be maintained at no higher than approximately 100 degrees Celsius since this is the boiling point of water. As long as enough of the fugitive material (water) remains in indirect contact with the selected portions of the electronic component while subjected to the high reflow temperatures, that portion of the electronic component will remain at a lower temperature than the heated internal environment of the oven. Thus, as long as the portion of the electronic component can withstand at least 100 degrees C., no damage to the selected portion in indirect contract with the fugitive material will result from the high solder oven temperatures. It should be recognized by those skilled in the art that the use of the evaporative cooling vessel 100 will be highly effective with electronic devices such as semiconductors, as well as those mechanical devices such as connectors and fastening type mechanisms that would be damaged by 200 degree C. peak reflow temperatures.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An evaporative vessel for controlling the temperature of an electronic part during solder reflow comprising:

a housing made of a heat conductive material;

a cavity formed within the housing for holding fugitive material; and an insulating cover frictionally engaged over the cavity for preventing the rapid escape of the fugitive material.

2. An evaporative vessel as in claim 1 further comprising at least one section of insulating material attached to the housing for rejecting heat on predetermined exposed areas of the housing where no increase in heat is desired.

3. An evaporative vessel as in claim 1 wherein the insulating cover includes a plurality of vents for allowing vapor to escape through the insulating cover when heated.

4. An evaporative vessel as in claim 1 wherein the fugitive material is positioned indirectly in contact with an electronic part for maintaining the electronic part at a predetermined temperature during solder reflow.

5. An apparatus for controlling the temperature of electronic parts during solder reflow comprising:

a heat conductive body;

a cavity positioned within the heat conductive body for containing a quantity of fugitive material;

a cover positioned over the cavity for preventing rapid evaporation of a volatile liquid fugitive material during solder reflow; and wherein the cavity is positioned in contact with a portion of an electronic part for allowing fugitive material in liquid form to evaporate during solder reflow while containing the remainder of fugitive material in liquid form.

6. An apparatus as in claim 5 wherein the cover includes at least one vent for limiting the escape of fugitive material.

7. An apparatus as in claim 5 further comprising: a plurality of feet for positioning the body into a predetermined location while in contact with the electronic part.

8. A vessel for maintaining the temperature of an electronic part during solder reflow comprising:

a heat sink made of a heat conductive material, the heat sink including at least one cavity for containing a predetermined amount of fugitive material;

a lid including at least one vent for frictionally engaging with the heat sink for covering the at least one cavity;

a plurality of feet for supporting the heat sink on surface; and wherein the cavity is positioned in contact with a portion of an electronic part for allowing the fugitive material to evaporate and maintain the electronic part at a predetermined temperature during solder reflow.

* * * * *